United States Patent [19]

Tohdoh et al.

[11] Patent Number: 4,914,145
[45] Date of Patent: Apr. 3, 1990

[54] POLYESTER COMPOSITION

[75] Inventors: Akira Tohdoh, Iwakuni; Takashi Nagai, Ootake; Takayuki Nakano, Saeki; Takashi Ueda, Iwakuni, all of Japan

[73] Assignee: Mitsui Petrochemical Industries, Ltd., Tokyo, Japan

[21] Appl. No.: 62,415

[22] Filed: Jun. 16, 1987

Related U.S. Application Data

[63] Continuation of Ser. No. 751,852, Jul. 5, 1985, abandoned.

[30] Foreign Application Priority Data

Jul. 9, 1984 [JP] Japan ................................. 59-140475
Aug. 10, 1984 [JP] Japan ................................. 59-166327
Aug. 31, 1984 [JP] Japan ................................. 59-180367

[51] Int. Cl.$^4$ ............................................. C08L 67/02
[52] U.S. Cl. ...................................... 524/285; 524/87; 524/89; 524/94; 524/99; 524/104; 524/289; 524/303; 524/304; 524/305; 524/368; 525/64; 525/166; 525/176; 525/177
[58] Field of Search .................... 524/289, 87, 89, 94, 524/99, 104, 285, 304, 303, 305; 525/176, 166, 64, 177

[56] References Cited

U.S. PATENT DOCUMENTS

| | | | |
|---|---|---|---|
| 2,585,448 | 2/1952 | Emerson | 524/289 |
| 3,639,527 | 2/1972 | Brinkmann | 525/176 |
| 3,769,260 | 10/1973 | Segal | . |
| 4,352,904 | 10/1982 | Deyrup | 524/292 |
| 4,366,273 | 12/1982 | Aharoni | 523/400 |
| 4,368,283 | 1/1983 | Kishida et al. | . |
| 4,401,792 | 8/1983 | Axelrod | 525/175 |
| 4,506,050 | 3/1985 | Hergenrother | 524/143 |
| 4,511,527 | 4/1985 | Dolce | 575/176 |

FOREIGN PATENT DOCUMENTS

| | | |
|---|---|---|
| 0073042 | 3/1983 | European Pat. Off. . |
| 59-047258 | 3/1984 | Japan . |
| 1194704 | 6/1970 | United Kingdom . |

OTHER PUBLICATIONS

Patent Abstracts, vol. 8, No. 138.

Primary Examiner—Patricia Short
Attorney, Agent, or Firm—Cushman, Darby & Cushman

[57] ABSTRACT

As an outline of the invention of the present inventors, the gist of the present invention resides in the following:

A polyester composition comprising:
(A) 100 parts by weight of a substantially linear polyester comprising, as the main constituent unit, ethylene terephthalate;
(B) 0.05 to 15 parts by weight of a crystallization promotor; and
(C) 0.1 to 15 parts by weight of at least one plasticizer selected from the group consisting of ($C_1$), ($C_2$), ($C_3$) and ($C_4$) which are defined as follows:
($C_1$) a condensation product of a compound of the formula (I):

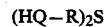

$$(HQ-R)_2S \qquad (I)$$

wherein two R groups may be the same as or different from each other and represent a hydrocarbon group selected from the group consisting of aliphatic, alicyclic, and aromatic hydrocarbon groups and any combination thereof, and two Q groups may be the same as or different from each other and represent oxygen or sulfur, with an organic compound containing two alcoholic or phenolic hydroxyl groups:
($C_2$) an ester compound derived from an organic acid and a compound selected from the group consisting of compounds of the above-mentioned formula (I) and the condensation products ($C_1$).
($C_3$) an ether compound derived from a compound selected from the group consisting of compounds of the above-mentioned formula (I) and the condensation products ($C_1$) and a compound selected from the group consisting of monohydric alcohols and monohydric phenols.
($C_4$) a modified polyolefin wax selected from oxidized polyolefin waxes, unsaturated carboxylic acid or its derivative graft-modified polyolefin waxes, unsaturated epoxy compound-modified polyolefin waxes, unsaturated silane compound-modified polyolefin waxes, and styrene type monomer-modified olefin waxes.

9 Claims, No Drawings

POLYESTER COMPOSITION

This is a continuation of application Ser. No. 751,852, filed July 5, 1985, now abandoned.

FIELD OF THE INVENTION

The present invention relates to a polyester composition comprising, as the main constituent unit, ethylene terephthalate and having excellent heat resistance and an improved rate of crystallization.

BACKGROUND OF THE INVENTION

Substantially linear polyesters comprising, as the main constituent unit, an ethylene terephthalate, such as polyethylene terephthalate, have been heretofore used as a material for molded article having various shapes, such as a film, a sheet, a laminate, and a container, because of their excellent stiffness, heat resistance, and gas barrier properties. However, these polyesters are disadvantageous in that the rate of crystallization is slow and they cannot be molded at a high speed. Therefore, a means of elevating the temperature of the mold is used to enhance the rate of crystallization of the polyesters. However, use of this means involves disadvantages in that the resin undergoes thermal deterioration and the molded article tends to be warped.

In order to increase the rate of crystallization and to improve the mechanical properties such as heat resistance and stiffness, of the polyesters, there have been proposed methods comprising blending various additives with the polyesters. These methods include the blending of inorganic compounds such as talc, metal salts of aliphatic or aromatic carboxylic acids, or polymers such as polyalkylene glycols, alkoxypolyalkylene glycols, ethylene-(meth)acrylic acid salt copolymers, unsaturated polyesters, and polyamides with the polyesters. For example, U.S. Pat. No. 3,639,527 proposes copolymers of ethylene or styrene with salts of acrylic and methacrylic acid or the like. U.S. Pat. No. 4,352,904 and U.K. patent application GB No. 2,015,013 propose techniques of blending (1) fillers or the like, (2) sodium or potassium salts of organic polymers having pendant carboxyl groups, and (3) organic esters. Examples of the salts of organic polymers (2) are sodium salts of ethylene-methacrylic acid copolymers and sodium salts of styrene-maleic anhydride copolymers. Japanese Unexamined Patent Publication Nos. 56-145943, 56-127655, and 57-145145 propose techniques of blending the same copolymer salts as those described in (2) above and polyalkylene glycols or their derivatives.

Japanese Unexamined Patent Publication Nos. 56-109244 and 56-109245 propose a technique of blending polyethylene wax, optionally a nucleating agent and a crystallization promoter with a polyethylene terephthalate resin. Similarly, U.S. Pat. No. 3,405,198 discloses the technique of blending polyethylene.

Japanese Unexamined Patent Publication No. S 58-76446 and 57-8241 propose techniques of blending specific polyethers or polyesters. UK Patent Specification GB No. 1282679 and Japanese Unexamined Patent Publications Nos. 51-148744, 57-38847 and 58-63743 propose a technique of blending metal salts of carboxylic acids.

SUMMARY OF THE INVENTION

As an outline of the invention of the present inventors, the gist of the present invention resides in the following:

A polyester composition comprising:

(A) 100 parts by weight of a substantially linear polyester comprising, as the main constituent unit, ethylene terephthalate;

(B) 0.05 to 15 parts by weight of a crystallization promoter; and (C) 0.1 to 15 parts by weight of at least one plasticizer selected from the group consisting of ($C_1$), ($C_2$), ($C_3$) and ($C_4$) which are defined as follows:

($C_1$) a condensation product of a compound of the formula (I):

$$(HQ-R)_2 S \qquad (I)$$

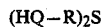

wherein two R groups may be the same as or different from each other and represent a hydrocarbon group selected from the group consisting of aliphatic, alicyclic, and aromatic hydrocarbon groups and any combination thereof, and two Q groups may be the same as or different from each other and represent oxygen or sulfur, with an organic compound containing two alcoholic or phenolic hydroxyl groups:

($C_2$) an ester compound derived from an organic acid and a compound selected from the group consisting of compounds of the above-mentioned formula (I) and the condensation products ($C_1$)

($C_3$) an ether compound derived from a compound selected from the group consisting of compounds of the above-mentioned formula (I) and the condensation products ($C_1$) and a compound selected from the group consisting of monohydric alcohols and monohydric phenols.

($C_4$) a modified polyolefin wax selected from oxidized polyolefin waxes, unsaturated carboxylic acid or its derivative graft-modified polyolefin waxes, unsaturated epoxy compound-modified polyolefin waxes, unsaturated silane compound-modified polyolefin waxes, and styrene type monomer-modified olefin waxes.

DETAILED DESCRIPTION OF THE INVENTION

Component (A)

The polyester (A) incorporated into the polyester composition of the present invention is a substantially linear polyester comprising, as the main constituent unit, ethylene terephthalate. The polyester contains at least 70 mole %, preferably at least 80 mole %, more preferably at least 85 mole % of the ethylene terephthalate constituent unit.

The dicarboxylic acid component units constituting the polyester may contain a small amount of aromatic dicarboxylic acid component units other than terephthalic acid component units. The aromatic dicarboxylic acid component units other than the terephthalic acid component units may include, for example, isophthalic acid, phthalic acid, and naphthalene dicarboxylic acid.

The diol component units constituting the polyester may contain a small amount of diol component units other than ethylene glycol component units. The diol component units other than ethylene glycol component units may include, for example, diol component units having 3 to 20 carbon atoms such as propylene glycol, 1,3-propanediol, 1,4-butane diol, neopentyl glycol, cyclohexanediol, cyclohexanedimethanol, 1,4-bis(β-hydroxyethoxy) benzene, 1,3-bis(β-hydroxyethoxy) benzene, 2,2-bis(4-β-hydroxyethoxyphenyl) propane, bis(4-β-hydroxyethoxyphenyl)sulfone, bis(4-hydroxyphenyl)methane, and 2,2-bis(4-hydroxyphenyl)propane, and polyalkylene glycol units having a molecular weight of 300 to 10,000 such as polyethylene glycol, polypropylene glycol, polytetramethylene glycol.

The polyester of the present invention may optionally contain a small amount of polyfunctional compounds, in addition to the above-mentioned aromatic dicarboxylic acid component units and the above-mentioned aromatic dicarboxylic acid component units and the above-mentioned diol component units. Examples of such polyfunctional compound component units are aromatic polybasic acids such as trimellitic acid, trimesic acid, pyromellitic acid, and 3,3',5,5'-tetra-carboxydiphenyl; aliphatic polybasic acids such as butanetetracarboxylic acid; aromatic polyols such as phloroglucin and 1,2,4,5-tetrahydroxybenzene; aliphatic polyols such as glycerol, trimethylolethane, trimethyl-olpropane and pentaerythritol; and oxypolycarboxylic acids such as tartaric acid and malic acid.

Furthermore, the polyester of the present invention may contain a small amount of hydroxycarboxylic compounds such as p-hydroxybenzoic acid as a constituent unit, in addition to the above-mentioned aromatic dicarboxylic acid component units, diol component units, and polyfunctional compounds.

The polyester composition is such that the content of the terephthalic acid component unit is usually in the range of from 40 to 51 mole %, preferably from 43 to 50.5 mole %; the content of the aromatic dicarboxylic acid component unit other than the terephthalic acid component unit is usually in the range of from 0 to 10 mole %, preferably from 0 to 7 mole %; the content of the ethylene glycol component unit is usually in the range of from 35 to 51 mole %, preferably from 40 to 50.5 mole %; the content of the diol component unit other than the ethylene glycol component unit is usually in the range of from 0 to 15 mole %, preferably from 0 to 10 mole %, and the content of the polyfunctional compound unit is usually in the range of from 0 to 10 mole %, preferably from 0 to 8 mole %. The polyester of the present invention usually has an intrinsic viscosity [$\eta$] of 0.45 to 2.0 dl/g, preferably 0.50 to 1.8 dl/g, determined in p-chlorophenol at a temperature of 50° C. The polyester usually has a melting point of 180° C. to 280° C., preferably 200° C. to 270° C., and a glass transition temperature of 40° C. to 140° C., preferably 50° C. to 120° C.

With respect to the expressions "constituent unit" or "component unit", it should be noted that the acids and alcohols described above are not always used as the direct starting materials in production of the polyester of the invention.

Component (B)

The crystallization promotors (B) incorporated into the polyester composition of the present invention may be any known crystallization promotors. Examples of such crystallization promotors are solid inorganic compounds such as talc and clay; salts of organic carboxylic acids such as caproic acid, stearic acid, montanic acid, benzoic acid and terephthalic acid, e.g., sodium and potassium salts of these carboxylic acids.

The inventors found that an alkali metal salt or alkaline earth metal salt of a specific organic carboxylic acid containing an imido linkage and having not greater than 50 carbon atoms, preferably 6 to 45 carbon atoms, more preferably 6 to 40 carbon atoms, is an excellent crystallization promotor.

Such carboxylic acids are usually those having the formula (B-I)

wherein, $X^1$ and $X^2$ (these are collectively referred to as X, hereinafter, may be combined with each other and are preferably in the combined form), and Y each represents an aliphatic group, an alicyclic group, an aromatic group or a combination thereof, and at least one of X and Y contains an carboxyl group, and further, X and Y may contain a member selected from the group consisting of a halogen atom, a nitro group and an amino group, and when X contains a carboxyl group; Y may be a hydrogen.

Among the carboxylic acids of the formula (B-1), the preferred carboxylic acids are those in which X represents an aliphatic group are those having the formula (B-II):

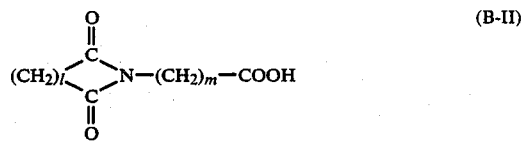

wherein l is 2 to 3, and m is an integer of 1 to 15. Examples of such carboxylic acids are:

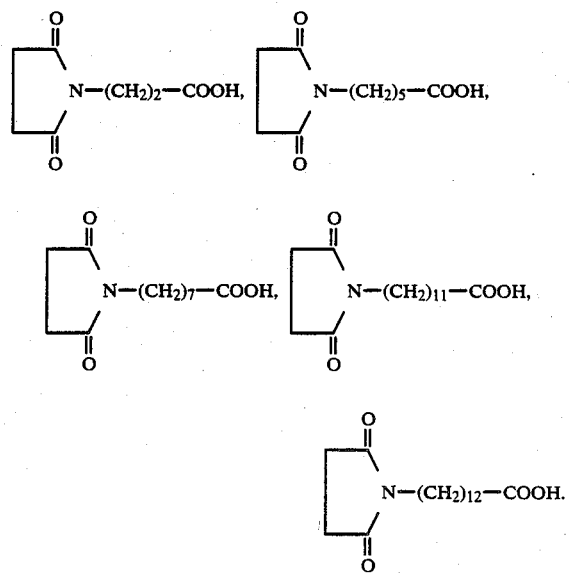

The following carboxylic acids also may be used:

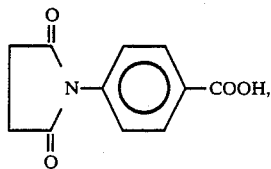

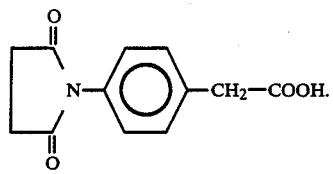

Among the carboxylic acids of the formula (B-I), the preferred carboxylic acids are those in which X represents an alicyclic group having the formula (B-III):

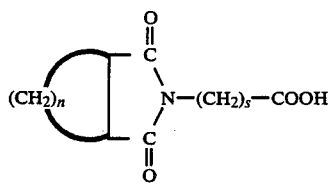
(B-III)

wherein n is an integer of 3 to 6, preferably 4, and s is an integer of 1 to 15. Examples of such carboxylic acids are:

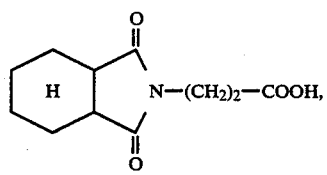

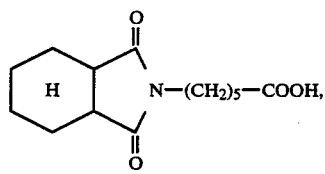

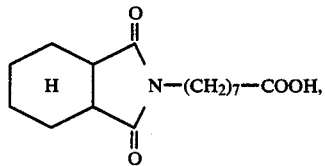

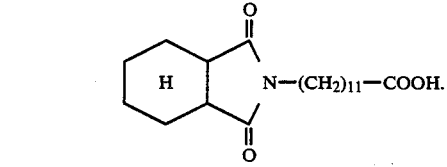

Among the carboxylic acids of the formula (B-I), the carboxylic acids in which X represents an aromatic group and which are preferably used in the composition of the present invention are phthalimide derivatives, trimellitimide derivatives and pyromellitdimide derivatives which are represented by the formula (B-IV) or (B-V):

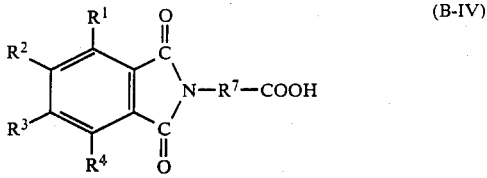
(B-IV)

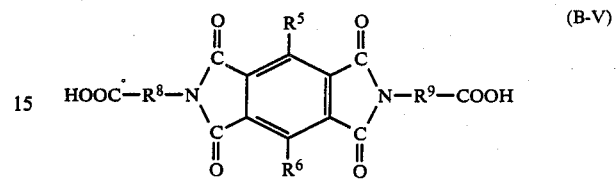
(B-V)

wherein, $R^1$ to $R^6$ represent, independently from each other, a group selected from the group consisting of a hydrogen atom, lower alkyl groups, aryl groups, aralkyl groups, halogen atoms, a carboxyl group, a nitro group, and an amino group; and $R^7$ to $R^9$ represent, independently from each other, a hydrocarbon group having not greater than 20 carbon atoms. Examples of such carboxylic acids are:

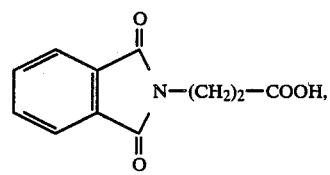

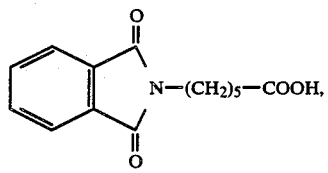

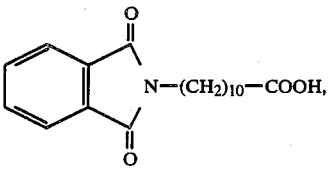

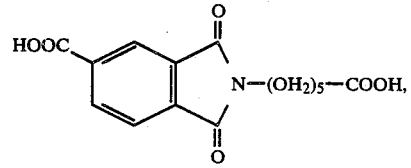

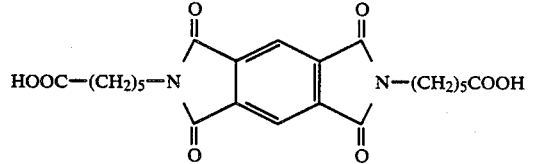

The alkali or alkaline earth metals constituting the salts of the above-mentioned carboxylic acids may include, for example, K, Na Cs, Mg, Ca, Sr, and Ba. Of these, K and Na are preferable.

Especially preferable examples are the following compounds:

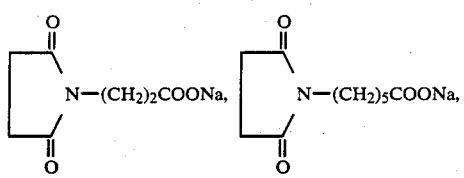

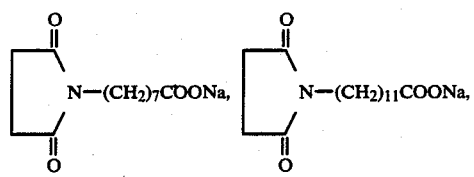

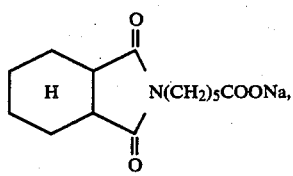

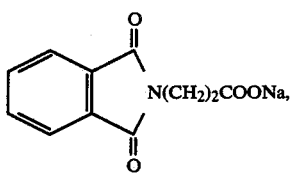

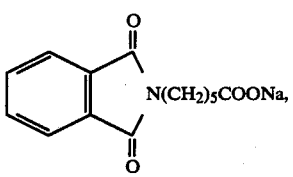

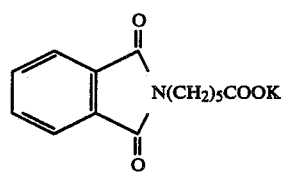

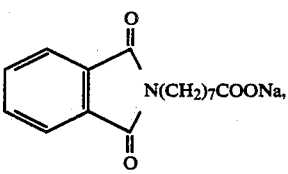

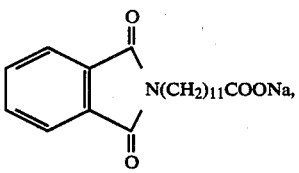

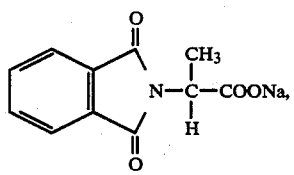

the mono- or di-sodium salt of

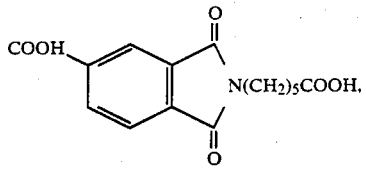

the mono- or di-sodium salt of

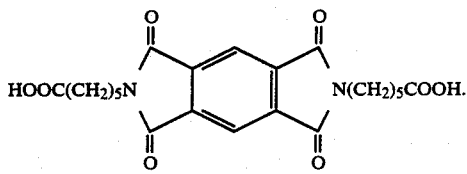

Other examples of the crystallization promotor suitable as a component (B) are metal salts of organic polymers containing pendant carboxyl groups or carboxylic anhydride groups such as copolymers of olefins or aromatic olefins with unsaturated carboxylic acid or its anhydride. Examples of the olefin include ethylene, propylene and 1-butene, those of the aromatic olefins include styrene, α-methylstyrene, vinyltoluene and isopropenyltoluene, those of the unsaturated carboxylic acid or its anhydride include acrylic acid, methacrylic acid crotonic acid, maleic acid, itaconic acid, maleic anhydride and itaconic anhydride. The copolymer may contain 50 to 99.8 mole %, preferably 60 to 99.5 mole %, more preferably 70 to 99 mole of the olefin unit or aromatic olefin unit.

The copolymer may be random copolymer, graft copolymer or block copolymer.

The number average molecular weight of the copolymer measured by gel permeation chromatography (GPC) at 40° C. using tetrahydrofran (THF) as a solvent, can be usually 1,000 to 50,000, preferably 2,000 to 30,000.

The molecular weight distribution (Mw/Mn) of the copolymer can be normally 1.1 to 20, preferably 1.2 to 15. Hereinabove, Mw means the weight average molecular weight and Mn means the number average molecular weight.

As the metal component of the metal salt of the organic polymer, alkaline metal such as sodium, potassium and cesium or alkaline earth metal such as magnesium, calcium and barium are exemplified. Among those metals, sodium and potassium are especially preferred.

The pendant carboxyl group or carboxylic anhydride group of the organic polymers is neutralized completely or partly. Neutralization degree of the carboxylic group or carboxylic anhydride group in the organic polymers, for example, can be 30 mole % to 100 mole %, preferably 30 mole % to 75 mole %. In determining the neutralization degree, it should be supposed that one carboxylic anhydride group corresponds to two carboxyl groups.

In those metal salts of the organic polymers, sodium salt or potassium salt of copolymer composed of ethylene and methacrylic acid are particularly preferred.

Component (C)

The plasticizers (C) incorporated into the polyester composition of the present invention are those selected from the group consisting of the above-mentioned classes ($C_1$), ($C_2$), ($C_3$) and ($C_4$). These compounds may be used alone or in any mixture of two or more thereof.

In the compound of formula (I)

(HQ-R)$_2$S,

R represents a hydrocarbon group selected from the group consisting of aliphatic hydrocarbon groups having at least two carbon atoms, alicyclic hydrocarbon groups, and aromatic hydrocarbon groups, and combinations thereof; two R groups may be the same as or different from each other. The aliphatic hydrocarbon groups include straight and branched aliphatic hydrocarbon groups usually having 2 to 10 carbon atoms, preferably 2 to 6 carbon atoms. The alicyclic hydrocarbon groups are preferably those having not more than 10 carbon atoms, more preferably 4 to 6 carbon atoms and these hydrocarbon groups may have alkyl substituents on the ring. The aromatic hydrocarbon groups may have preferably 6 to 10 carbons atoms and may be benzene ring or at least one alkyl group-subsituted benzene ring.

Q represents oxygen or sulfur. Two Q groups may be the same as or different from each other.

Examples of the compound of formula [I] are thiodiethanol, thiodipropanol, thiodibutanol, 2-hydroxypropyl sulfide, thiodicyclohexanol, thiodicyclopentanol, 2-methylmercaptoethyl sulfide, thiodibenzyl alcohol, and thiodiphenol.

The organic compounds condensed with a compound of the formula (I) to form the condensation product ($C_1$) are those containing two alcoholic or phenolic hydroxyl groups. In this case, the compounds may contain two alcoholic or phenolic hydroxyl groups in one molecule, or they may contain alcoholic hydroxyl group and one phenolic hydroxyl group in one molecule.

These organic compounds may include, in addition to the compounds of the formula (I) themselves in which Q is oxygen, alkylene glycols described below in detail, divalent phenols such as hydroquinone, resorcinol, and bisphenol A; hydroxyalkylphenols such as p-methylolphenol, m-methylolphenol, and salicyl alcohol; and dihydroxycycloalkanes.

The condensation products ($C_1$) may have molecular weight of from about 500 to 15,000, preferably from about 800 to 10,000.

The preferred condensation products ($C_1$) are polythiodiethanol and a condensation product of thiodiethanol and an alkylene glycol. The polythiodiethanol is a compound of the formula [II]:

HO$+$CH$_2$CH$_2$SCH$_2$CH$_2$—O$\overline{)_n}$H  [II]

wherein n is preferably from 150 to 5, more preferably from 100 to 10.

The condensation product of thiodiethanol and an alkylene glycol will now be explained. The alkylene glycols may include, for example, ethylene glycol, propylene glycol, tetramethylene glycol, neopentyl glycol, diethylene glycol, and triethylene glycol. One of these alkylene glycols may be condensed with thiodiethanol. Alternatively, two or more of the alkylene glycols may be co-condensed with thiodiethanol. In this case, the thiodiethanol compound unit may be condensed in the form of a block or randomly. The latter case is more preferable. The condensation product usually contains at least 60 mole %, preferably at least 70 mole %, of the thiodiethanol component unit, and has preferably a molecular weight of 800 to 15,000.

To obtain the condensation products by reacting the compounds of formula (I) with phenols or alcohols, well known methods are used.

The ester compounds of the class ($C_2$) will then be explained. The alcohol components usable for the preparation of the ester compound ($C_2$) include, in addition to the compounds of the formula (I), the above-mentioned condensation products ($C_1$), preferably polythiodiethanol, and condensation products of thiodiethanol and alkylene glycols. Even the condensation product ($C_1$) having the smallest molecular weight may be used. The preferred upper limit of the molecular weight of the condensation product used is 15,000. Examples of the acids which, together with these alcohols, form the ester, are organic acids such as aliphatic organic acids, aromatic organic acids, and alicyclic organic acids. The aliphatic organic acids usable for the formation of the ester are those having preferably 2 to 20 carbon atoms, e.g., acetic acid, propionic acid, butyric acid, valeric acid, caproic acid, enanthic acid, caprylic acid, pelargonic acid, stearic acid, and isomers thereof. The aromatic organic acids usable for the formation of the ester may have 7 to 20 carbon atoms and include, for example, benzoic acid, nitrobenzoic acid, toluic acid, phthalic acid, isophthalic acid, and terephthalic acid. Of these, benzoic acid is especially preferable. The alicyclic organic acids usable for the formation of the ester have 7 to 20 carbon atoms and may include, for example, cyclohexane carboxylic acid, cycloheptane carboxylic acid, and cyclohexane dicarboxylic acid.

The ester compounds ($C_2$) may have a molecular weight of from 170 to 1,000, preferably from 250 to 800.

The especially preferred ester compounds ($C_2$), are dibenzoate of thiodiethanol, dibenzoate of thiodipropanol, dibenzoate of a condensation product of thiodiethanol and diethylene glycol, and diacetate of thiodiphenol.

The ester compounds ($C_2$) can be produced by well known methods.

The ether compound ($C_3$) derived from a compound selected from the group consisting of the compounds of the formula (1) and the condensation products ($C_1$), and a compound selected from the group consisting of monohydric alcohols and monohydric phenols will now be explained. The term "monohydric alcohol" as used herein refers to aliphatic alcohols alicyclic alcohols, and arylalkyl alcohols. Those alcohols may have 1 to 20 carbon atoms. The condensation product ($C_1$) is preferably the same as that used for the ester compound ($C_2$). Preferable examples of the condensation products ($C_3$), are diphenyl ether of thiodiethanol, diphenyl ether of a condensation product of thiodiethanol and diethylene glycol, and dimethyl ether of thiodiphenol. Usually, condensation products ($C_3$) may have a molecular weight of from 150 to 1,000, preferably from 250 to 800.

The modified polyolefin wax of the class ($C_4$) is selected from oxidized polyolefin waxes, unsaturated carboxylic acid or its derivative graft-modified polyolefin waxes, unsaturated epoxy compound-modified polyolefin waxes, unsaturated silane compound-modified polyolefin waxes and styrene type monomer-modified polyolefin waxes.

The polyolefin waxes usable as a raw material for the modified polyolefin waxes may include, for example, polyolefin waxes obtained by a method for the thermal decomposition or radical decomposition of polyolefins such as polyethylene, polypropylene, poly(4-methyl-1-pentene); polyethylene wax prepared by radical polymerization of ethylene under a high pressure; and polyolefin waxes obtained by polymerizing ethylene, propylene, or these olefins and α-olefins such as, 1-butene, 1-hexene, 4-methyl-1-pentene and 1-decene in the presence of transition metal compounds under a medium or low pressure. Of these polyolefin waxes, those comprising ethylene as the main component are preferable. For example, polyolefin waxes having at least 80 mole %, preferably at least 85 mole % of ethylene component, are most suitable. The polyolefin wax usually has an intrinsic viscosity [η] of 0.04 to 1.0 dl/g, preferably 0.06 to 0.8 dl/g, determined in decalin solution at a temperature of 135° C.

The oxidized polyolefin waxes usable in the present invention are those obtained by oxidizing the polyolefin waxes by means of any conventional method, for example, the methods described in U.S. Pat. No. 3,892,717 and Japanese Unexamined Patent Publication No. 48-29876. The oxygen content of the oxidized polyolefin wax is usually in the range of from 0.1 to 11% by weight, preferably from 0.2 to 8% by weight. The oxygen contained in the wax is present in the form of a hydroxyl group, carbonyl group such as an aldehyde and a ketone, a carboxyl group, or the like. The oxidized polyolefin wax is also used as a raw wax for the production of the other modified polyolefin waxes as described hereinafter. The oxidized polyolefin wax may have an intrinsic viscosity [η] of 0.04 to 1.0 de/g, preferably 0.04 to 0.7 dl/g, determined in decalin solution at a temperature of 135° C.

Those oxidized polyolefin waxes may be usable as raw materials from which the modified polyolefin waxes described hereinafter are derived.

Further, modified polyolefin waxes containing ester groups which are derived from the above oxidized polyolefin waxes and alcohols and/or organic acids, may also be usable as members of class ($C_4$).

The unsaturated monomer useful for the preparation of the unsaturated carboxylic acid or its derivative graft-modified polyolefin waxes include unsaturated carboxylic acids such as (meth)acrylic acid, maleic acid, fumaric acid, tetra-hydrophthalic acid, itaconic acid, citraconic acid, crotonic acid, isocrotonic acid, and Nadic Acid ® (endo-cis-bicyclo[2,2,1]hepto-5-ene-2,3-dicarboxylic acid) and their derivatives such as acid halides, amides, imides, anhydrides, and esters, e.g., malenyl chloride, maleimide, maleic anhydride, citraconic anhydride, monomethyl maleate, acrylic amide, dimethyl maleate, glycidyl maleate, methyl(metha)acrylate, ethyl(metha)acrylate, n-butyl(metha)acrylate, and 2-ethylhexyl(metha) acrylate. Of these, anhydrides and esters of unsaturated carboxylic acids are preferable, and maleic anhydride, Nadic Anhydride ®, ethyl(metha)acrylate, n-butyl(metha)acrylate, and 2-ethylhexyl(metha)acrylate are especially preferable.

The graft-modified polyolefin waxes of the present invention can be prepared by any conventional method, e.g., by reacting monomers for polyolefin waxes in the presence of a radical initiator such as an organic peroxide, an organic perester and an azo compound under a condition in which the polyolefin waxes are melted.

The graft modification amount is usually from 0.2 to 50% by weight, preferably from 0.5 to 40% by weight, expressed in terms of the monomer content in the graft-modified polyolefin.

Those unsaturated carboxylic acids or derivative graft-modified polyolefin waxes may have an intrinsic viscosity of 0.04 to 1.0 dl/g, preferably 0.06 to 0.8.

The above-mentioned unsaturated carboxylic acid or its derivative graft-modified polyolefin waxes also may be used as a raw wax for the preparation of the other modified polyolefin waxes described hereinafter. Furthermore, modified polyolefin waxes containing ester groups which are derived from the unsaturated carboxylic acid or its derivative graft-modified polyolefin waxes and alcohols also may be used as members of class ($C_4$).

As the unsaturated epoxy compound-modified polyolefin waxes, those which are already known, e.g., those obtained by the method described in Japanese Unexamined Patent Publication No. 55-157613, can be directly used. The unsaturated epoxy compound can include allyl type unsaturated epoxy compounds, e.g., allyl glycidyl ether, 2-methylallyl glycidyl ether, and glycidyl ether of o-, m-, or p-allylphenol, 2-(o-, m-, or p-allylphenyl)ethylene oxide; styrene type unsaturated epoxy compounds such as glycidyl ether of isopropenyl phenol; and aliphatic unsaturated compounds containing epoxy groups, e.g., 3,4-epoxy-1-butene, and 3,4-epoxy-3-methyl-1-butene. The unsaturated epoxy compound-modified polyolefin wax used preferably contains an epoxy group in an amount of $10^{-4}$ to $3\times10^{-2}$ gram equivalent per grams of the polyolefin wax.

Those unsaturated epoxy compound-modified polyolefin waxes may have an intrinsic viscosity of 0.04 to 1.0 dl/g, preferably 0.06 to 0.8.

The unsaturated silane compound-modified polyolefin waxes usable as the component (C) are those described in, for example, Japanese Unexamined Patent Publication No. 54-145785. That is, such polyolefin waxes are, for example, those graft-modified with vinyltrimethoxysilane, vinyltriethoxysilane, and vinyltris(methoxyethoxy)silane. The graft percentage is usually from 3 to 45% by weight, preferably from 5 to 30% by weight.

The styrene type monomer-modified polyolefin waxes usable as the component (C) are those modified with styrene type monomer having 8 to 11 of carbon atoms, e.g., styrene, α-methylstyrene, p-methylstyrene, o-methyl-styrene, 2,4-dimethylstyrene, 2,5-dimethylstyrene, and the like, according to the method described for the above-mentioned modified polyolefin waxes modified with unsaturated carboxylic acids, or the like. More specifically, styrene type monomer-modified polyolefin waxes prepared by the method described in, for example, Japanese Unexamined Patent Publication No. 58-65713. The content of the styrene type monomer in the modified waxes is usually from 1 to 90% by weight, preferably from 5 to 75% by weight. As described hereinabove, modified waxes obtained by graft modifying the oxidized polyolefin waxes and the unsaturated carboxylic acid or its derivative graft-modified polyolefin waxes with styrene type monomer are also included in the styrene type monomer-modified polyolefin waxes used in the present invention.

Those styrene type monomer-modified polyolefin waxes may have an intrinsic viscosity of 0.04 to 1.0 dl/g, preferably 0.06 to 0.8 dl/g.

Of the above-mentioned modified polyolefin waxes ($C_4$), oxidized polyolefin waxes, oxidized polyolefin waxes further grafted with styrene type monomers, and α,β-unsaturated carboxylic acid estergrafted polyolefin waxes are especially preferable.

The compounding ratio of component (B) to polyester (A) is in the range of from 0.05 to 15 parts by weight, preferably from 0.1 to 10 parts by weight, more preferably 0.2 to 10 parts by weight per 100 parts by weight of the polyester (A). Similarly, the compounding ratio of component (C) to polyester (A) is in the range of from 0.1 to 15 parts by weight, preferably 0.2 to 10 parts by weight, more preferably 0.5 to 10 parts by weight, most preferably 1 to 10 parts by weight per 100 parts by weight of the polyester (A).

As long as the compounding ratios of components (B) and (C) to polyester (A) are in the above-specified ranges, improved effects of satisfactory rate of crystallization and satisfactory heat resistance which are characteristic of the composition of the present invention are realized.

Although the polyester composition of the present invention may consist only of the above-mentioned essential three components, polyester (A), and components (B) and (C), it may contain various compounding agents or additives conventionally used for polyesters as long as the utility of the composition is not impaired. Examples of such compounding agents or additives are reinforcing fillers such as diatomaceous earth, calcium carbonate, silica, silica-alumina, alumina, carbon, mica, titanium oxide, carbon fiber, glass fiber, and aramide fiber; lubricants; surfactants; thickening agents such as pentaerythritol, trimellitic acid and pyromellitic acid; flame-retardants; ultraviolet light stabilizers; antioxidants; releasing agents; and coloring agents. The compounding proportion of these compounding agents or additives may be appropriately selected.

Furthermore, the polyester composition of the present invention may contain at least one polymer selected from the group consisting of, for example, polyolefins, olefin copolymers or modified polymers thereof, polystyrene, polyamides, polycarbonates, polyacetals, polysulfone, polyphenylene oxides, fluoro-plastics, silicone resin, and epoxy resins.

The polyester composition of the present invention can be obtained by a method wherein a polymer mixture consisting of the essential components and, if necessary, the compounding agents or additives is melt mixed by any conventional method.

The present invention will now be explained in detail by the following examples

In the examples, the molding and evaluation of the polyester composition were carried out by the following methods.

Press molding

A dried polyester composition was pressed at a molding temperature of 290° C.; by using a pressing machine to prepare a quenched pressed sheet having a size of 15 cm × 10 cm × 0.2 cm.

Injection molding

A specimen for bending test having a thickness of 0.2 cm was prepared at a mold temperature of 70° C.; by using an injection molding machine Model IS-35P manufactured by Toshiba Kikai Kabushiki Kaisha.

Bending test

A strip specimen 1.27 cm wide by 6.35 cm long cut from the pressed sheet or an injection molded specimen of the same size was subjected to a bending test at a temperature of 23° C. and at a crosshead speed of 5 mm/min. by using a tensile testing machine model 1122 manufactured by Instron Company.

Heat resistance

A strip specimen 1.27 cm wide by 2 cm long cut from the pressed sheet or injection molded specimen was determined for temperature dependence of elastic modulus by using a Dynamic Mechanical Analyzer Model 981 manufactured by DuPont Company. The ratio of the elastic modulus at 100° C. ($E_{100}$) to the elastic modulus at 30° C. ($E_{30}$), i.e., $E_{100}/E_{30}$, was used as an indication of the heat resistance.

$T_{ch}$, $\Delta H_H/\Delta H_c$

These values were determined by using a differential analyzer (abbreviated as DSC, Type II manufactured by Perkin Elmer Company). That is, about 5 mg of a sample was weighed out from the quenched pressed sheet or the injection molded sheet. Then the sample was subjected to DSC measurement under condition in which the sample is heated at an increasing rate of 20° C./min. from room temperature, is held at a temperature of 290° C. for 5 min., and is thereafter cooled at an decreasing rate of 20° C./min. The crystallization temperature $T_{CH}$ during the increase in temperature, the quantity of heat $\Delta H_H$ determined from a peak area appearing at $T_{CH}$, and the quantity of heat $\Delta H_C$ determined from a peak area appearing at the crystallization temperature during the decrease in temperature were measured from the resultant curve of heat. The thus-obtained $T_{CH}$ is an indication of the low temperature mobility of the polyester molecule. The $\Delta H_H/\Delta H_C$ is an indication of the crystallizability of the polyester. The smaller the values of $T_{CH}$ and $\Delta H_H/\Delta H_C$, the more crystallizable the polyester.

EXAMPLES 1 TO 12, COMPARATIVE EXAMPLES 1 TO 5 AND REFERENCE EXAMPLE 1

A polyethylene terephthalate having an intrinsic viscosity of 0.65 dl/g, a plasticizer such as a thiodiethanol derivative and various crystallization promotors were dry blended in the proportion indicated in Table 1. The resultant mixtures were melt mixed by using a 20 mm : extruder (a Dulmage type screw and, in the case where glass fiber is blended, a full-flighted screw, L/D = 28). The physical properties of the polyester compositions thus obtained were evaluated. The results are shown in Table 1.

In Table 1, the symbols represent the following:

(1) C-1 in plasticizer component (C) is a polyethylene glycol (manufactured by Nippon Oils & Fats Co., Ltd., Polyethylene glycol 4000).

(2) C-2 in plasticizer component (C) is dibenzoate of thiodiethanol.

(3) C-3 in plasticizer component (C) is a copolymer ether of thiodiethanol and diethylene glycol. This compound was synthesized in the following manner.

A reaction vessel was charged with 200 g of thiodiethanol, 50 g of diethylene glycol, and 0.625 g of phosphorus acid. The mixture was reacted under a nitrogen atmosphere at a temperature of 195° C. for 8 hours while the formed water was distilled off, after which the reaction was continued under a reduced pressure of 50 mmHg for a further period of 5 hours. The resultant product was a pale yellow liquid polymer. This polymer had a number average molecular weight of 3,600, determined in GPC (THF solvent, 40° C.).

(4) C-4 in plasticizer component (C) is dibenzoate of thiodipropanol.

(5) C-5 in plasticizer component (C) is diacetate of thiodiphenol.

(6) C-6 in plasticizer component (C) is dimethyl ether of thiodiphenol.

(7) C-7 in plasticizer component (C) is dibenzoate of 2-mercaptoethyl sulfide.

(8) B-1 in crystallization promotor (B) is talc.

(9) B-2 in crystallization promotor (B) is the sodium salt of an ethylene/methacrylic acid copolymer (manufactured by DuPont Company, Surlyn ® 1605 ethylene content of 95 mole %, Melt Flow Index of 2.8, measured at temperature of 190° C., under load of 2.16 kg).

(10) B-3 in crystallization promotor (B) is the sodium salt of a styrene/methacrylic acid copolymer. This compound was synthesized in the following manner.

A reaction vessel provided with a stirrer was charged with 624 g of styrene, 33.8 g of methacrylic acid and 920 ml of toluene. After nitrogen bubbling for 15 minutes, the reaction vessel was sealed with nitrogen and the contents of the reaction vessel were heated to a temperature of 100° C. A dropping funnel was charged with 2 g of benzoyl peroxide and 60 ml of toluene. After nitrogen bubbling for 15 minutes, the mixture in the funnel was dropped into the reaction vessel over a period of about 30 minutes. After completion of the dropping, the reaction was continued for 4 hours. The reaction mixture was then poured into a large excessive amount of hexane to allow the reaction product to precipitate. The yield of the resultant polymer was 292 g. The polymer had a number average molecular weight Mn of 84,000, determined in GPC (THF solvent, 40° C.), and a molecular weight distribution Mw/Mn of 1.5. The content of methacrylic acid in the polymer was determined by elemental analysis and was found to be 10 mole %.

A reaction vessel provided with a condenser was charged with 200 g of the styrene/methacrylic acid copolymer synthesized according to the abovementioned method and 1200 ml of toluene. The contents of the reaction vessel were heated to a temperature of 100° C. An aqueous solution containing 6.18 g of NaOH was dropped into the reaction vessel through a dropping funnel over 5 minutes. The reaction was continued for a further 4 hours. The reaction mixture was poured into hexane to allow the reaction product to precipitate. The precipitated polymer was recovered. The resultant polymer exhibited a degree of neutralization of 75%.

(11) B-4 in crystallization promotor (B) is sodium benzoate (manufactured by Wako Pure Chemical Industries, Ltd. in Japan).

EXAMPLES 13 TO 32 AND COMPARATIVE EXAMPLES 6 TO 9

A polyethylene terephthalate having an intrinsic viscosity of 0.65 dl/g, a crystallization promotor, and a modified polyolefin wax as a plasticizer were dry blended in the proportions indicated in Table 1. The resultant mixtures were melt mixed by using a 20 mmφ extruder (a Dulmage type screw and, where glass fiber is blended, a full-flighted screw, L/D =28). The physical properties of the thus-obtained polyester compositions were evaluated. The results are shown in Table 2. It is apparent from Table 2 that the compositions of the present invention are superior in various properties to the corresponding compositions comprising only the components (A) and (B).

In Table 2, the symbols represent the following:

(1) B-6 is sodium stearate.

(2) B 7 is sodium 5-(N-phthalimide)caproate.

(3) B-8 is the sodium salt of a styrene/methacrylic acid copolymer (content of methacrylic acid: 15 mole %, degree of neutralization: 75%). This compound was synthesized in the same manner as that described for the synthesis of B-3.

(4) C-8 is a sample comprising a polyethylene wax having a $[\eta]$ of 0.23 dl/g with which 14 wt. % of n-butyl methacrylate was graft polymerized. This sample was synthesized according to the following method and various modified waxes were synthesized according to the same method.

PREPARATION EXAMPLE OF GRAFT-MODIFIED POLYOLEFIN WAX 595 g of a polyethylene wax having a $[\eta]$ of 0.23 dl/g was charged into a glass reaction vessel having a capacity of 1 l, and was melted at a temperature of 140° C. Then, 105 g of n-butyl methacrylate and 9.0 g of di-tert-butyl peroxide were added to the reaction vessel. The mixture was reacted with heat for 4 hours. Then the reaction mixture was degassed under a vacuum pressure of 10 mmHg while it was maintained at a temperature of 140° C., so as to remove the volatile matters. Thereafter, the reaction product was cooled and solidified. The resultant n-butyl methacrylate grafted polyethylene wax has a n-butyl methacrylate graft percentage of 14% by weight.

(5) C-9 is a modified polyethylene wax with 40% by weight of n-butyl methacrylate graft-copolymerized therewith (a wax having a $[\eta]$ of 0.07 dl/g and containing 2 mole % of propylene copolymerized therewith was used as the starting material to be modified).

(6) C-10 is a polyethylene wax with 30% by weight of ethyl methacrylate copolymerized therewith (a polyethylene wax having a $[\eta]$ of 0.13 dl/g and a propylene content of 4 mole % was used as the starting material).

(7) C-11 is a polyethylene wax with 50% by weight of 2-ethylhexyl methacrylate graft-copolymerized therewith (the starting material was the same as that for C-9). Quantity of heat $\Delta H_H/\Delta H_C$ is an indication of the crystallizability of the polyester. The smaller the values of $T_{CH}$ and $\Delta H_H/\Delta H_C$, the more crystallizable the polyester.

(8) C-12 is a polyethylene wax with 10% by weight of 2-ethylhexyl methacrylate graft-copolymerized therewith (the starting material was the same as that for C-8).

(9) C-13 is an oxidized wax having an oxygen content of 4.9% by weight (a polyethylene wax having a $[\eta]$ of 0.23 dl/g and a propylene content of 4 mole % was used as the starting material).

(10) C-14 is an oxidized wax having an oxygen content of 7.0% by weight (the starting material was the same as that for C-8).

(11) C-15 is a modified wax comprising an oxidized wax having an oxygen content of 0.9% by weight with which 35% by weight of styrene was graft-copolymerized (the starting material was the same as that for C-9).

(12) C-16 is a wax to which 20% by weight of styrene and 10% by weight of acrylonitrile were co-grafted (the starting material was the same as that for C-10).

(13) C-17 is a maleic anhydride-grafted wax having a potassium hydroxide number of 30 mg/g (the starting material was the same as that for C-10).

(14) C-18 is a wax with 7% by weight of vinylmethoxysilane grafted thereto (the starting material was the same as that for C-8).

(15) C-19 is a wax containing allyl glycidyl ether grafted thereto and having an epoxy group content of $9 \times 10^{-4}$ gram equivalent per g of the wax (the starting material was the same as that for C-8).

TABLE 1

PHYSICAL PROPERTIES[a] OF POLYESTER COMPOSITION

| | Crystallization Promoter Component (B) | | Plasticizer Component (C) | | | | | | |
|---|---|---|---|---|---|---|---|---|---|
| | Type | Compounding Amount (part by weight)[b] | Type | Compounding Amount (part by weight)[b] | $E_{100/30}$ | Bending Strength (kg/cm$^2$) | Bending Modulus (kg/cm$^2$) | $T_{CH}$ (°C.) | $\Delta H_H / \Delta H_c$ |
| Comparative Example | | | | | | | | | |
| 1 | None | — | None | — | 0.003 | 920 | 31000 | 146 | 0.575 |
| 2 | B-1 | 1 | None | — | 0.014 | 880 | 28000 | 130 | 0.416 |
| 3 | B-2 | 5 | None | — | 0.065 | 890 | 27400 | 125 | 0.327 |
| 4 | B-3 | 5 | None | — | 0.087 | 1050 | 35000 | 124 | 0.384 |
| 5 | None | — | C-2 | 5 | 0.001 | 970 | 33100 | 124 | 0.391 |
| Reference Example 1 | B-3 | 5 | C-1 | 5 | 0.114 | 1040 | 35200 | 121 | 0.227 |
| Example | | | | | | | | | |
| 1 | B-3 | 5 | C-2 | 3 | 0.147 | 1090 | 37800 | 111 | 0.082 |
| 2 | B-3 | 5 | C-2 | 5 | 0.168 | 1140 | 41200 | 110 | 0.065 |
| 3 | B-1 | 1 | C-2 | 3 | 0.084 | 980 | 32400 | 117 | 0.212 |
| 4 | B-2 | 5 | C-2 | 3 | 0.132 | 990 | 33000 | 112 | 0.100 |
| 5 | B-2 | 5 | C-3 | 5 | 0.129 | 1010 | 32800 | 114 | 0.160 |
| 6 | B-3 | 5 | C-3 | 3 | 0.230 | 1000 | 38100 | 112 | 0.113 |
| 7 | B-4 | 0.2 | C-2 | 3 | 0.117 | 1020 | 37000 | 112 | 0.099 |
| 8 | B-2 | 5 | C-4 | 5 | 0.098 | 980 | 31000 | 119 | 0.213 |
| 9 | B-2 | 5 | C-5 | 3 | 0.096 | 970 | 31200 | 118 | 0.208 |
| 10 | B-3 | 5 | C-6 | 5 | 0.101 | 1020 | 35800 | 116 | 0.212 |
| 11 | B-2 | 5 | C-7 | 3 | 0.078 | 960 | 31000 | 119 | 0.311 |
| 12 | B-3 | 5 | C-2 | 3 | 0.392 | 2270 | 118700 | 108 | 0.310 |

[a]In Example 12, the physical properties of an injection molded article containing 30% by weight of glass fiber were shown. In the other Examples and Comparative Examples, the physical properties of pressed sheets were shown.
[b]A value based on 100 parts by weight of polyethylene terephtalate.

TABLE 2

PHYSICAL PROPERTIES[a] POLYESTER COMPOSITION

| | COMPONENT (B) | | COMPONENT (C) | | | Bending Strength (kg/cm$^2$) | Bending Modulus (kg/cm$^2$) | |
|---|---|---|---|---|---|---|---|---|
| | Type | Compounding Amount (part by weight)[b] | Type | Compounding Amount (part by weight)[b] | $E_{100/30}$ | | | $\Delta H_H / \Delta H_C$ |
| Comparative Example | | | | | | | | |
| 6 | B-6 | 0.2 | None | — | 0.013 | 900 | 29800 | 0.462 |
| 7 | B-7 | 0.2 | None | — | 0.037 | 1010 | 31600 | 0.390 |
| 8 | B-8 | 3 | None | — | 0.101 | 1020 | 34600 | 0.213 |
| 9 | None | — | C-8 | 5 | 0.002 | 840 | 27200 | 0.455 |
| Example | | | | | | | | |
| 13 | B-6 | 0.2 | C-8 | 5 | 0.044 | 950 | 30500 | 0.246 |
| 14 | B-7 | 0.2 | C-8 | 5 | 0.066 | 1010 | 32800 | 0.233 |
| 15 | B-2 | 5 | C-8 | 5 | 0.123 | 950 | 31000 | 0.200 |
| 16 | B-3 | 5 | C-8 | 5 | 0.169 | 1070 | 36000 | 0.080 |
| 17 | B-3 | 5 | C-8 | 2 | 0.157 | 1040 | 35800 | 0.106 |
| 18 | B-8 | 3 | C-8 | 5 | 0.213 | 1020 | 37000 | 0.087 |
| 19 | B-3 | 5 | C-9 | 3 | 0.133 | 990 | 34900 | 0.100 |
| 20 | B-3 | 4 | C-10 | 5 | 0.141 | 1010 | 33800 | 0.105 |
| 21 | B-8 | 3 | C-11 | 5 | 0.185 | 960 | 32400 | 0.097 |
| 22 | B-8 | 3 | C-12 | 5 | 0.166 | 1030 | 34300 | — |
| 23 | B-3 | 5 | C-13 | 5 | 0.190 | 1020 | 33700 | 0.200 |
| 24 | B-3 | 5 | C-14 | 5 | 0.199 | 1000 | 35000 | 0.141 |
| 25 | B-8 | 3 | C-15 | 4 | 0.135 | 1020 | 34600 | 0.128 |
| 26 | B-8 | 3 | C-16 | 3 | 0.122 | 980 | 30300 | 0.194 |
| 27 | B-3 | 5 | C-17 | 5 | 0.098 | 990 | 30700 | 0.225 |
| 28 | B-2 | 5 | C-18 | 4 | 0.084 | 930 | 30400 | 0.210 |
| 29 | B-2 | 5 | C-19 | 4 | 0.096 | 960 | 31200 | 0.186 |
| 30 | B-8 | 3 | C-15 | 3 | 0.392 | 1900 | 10800 | 0.032 |
| 31 | B-3 | 5 | C-8 | 3 | 0.411 | 2030 | 10700 | 0.029 |
| 32 | B-7 | 0.3 | C-2 | 3 | 0.082 | 1090 | 36500 | 0.297 |

[a]In Examples 30 and 31, the physical properties of injection molded articles containing 30% by weight of glass fiber are shown. In the other Examples and Comparative Examples, the physical properties of pressed sheets are shown.
[b]A value based on 100 parts by weight of polyethylene terephtalate.

What is claimed:
1. A polyester composition comprising:
(A) 100 parts by weight of a substantially linear polyester comprising, as the main constituent unit, ethylene terephthalate;
(B) 0.05 to 15 parts by weight of a crystallization promotor; and
(C) 0.1 to 15 parts by weight of at least one plasticizer selected from an ester compound derived from an organic acid and a compound selected from the group consisting of a compound of the formula (I)

$$(HQ-R)_2S \tag{I}$$

wherein two R groups which may be the same or different, represent a hydrocarbon group selected from the group consisting of aliphatic, alicyclic, and aromatic hydrocarbon groups and any combination thereof, and two Q groups, which may be the same or different, which represent oxygen or sulfur and a condensation product thereof with an organic compound containing two alcoholic or phenolic hydroxyl groups.

2. A polyester composition, according to claim 1, wherein the polyester contains at least 70 mole % of the ethylene terephthaltate units.

3. A polyester composition, according to claim 1, wherein the crystallization promoter (B) is the sodium salt or potassium salt of an organic carboxylic acid.

4. A polyester composition, according to claim 1, wherein the crystallization promoter (B) is a metal salt of a copolymer of an olefin or an aromatic olefin with an unsaturated carboxylic acid or its anhydride.

5. A polyester composition, according to claim 4, in which the metal salt is a sodium salt or potassium salt.

6. A polyester composition according to claim 1 wherein the promotor (B) is the sodium salt of an ethylene/methacrylic acid copolymer or the sodium salt of a styrene/methacrylic acid copolymer and the ester compound is the dibenzoate of thiodiethanol.

7. A polyester composition according to claim 1 wherein promotor (B) is the sodium salt of an ethylene/methacrylic acid copolymer.

8. A polyester composition according to claim 1 comprising:
glass fibers as a reinforcing filler.

9. A polyester composition comprising:
(A) 100 parts by weight of a substantially linear polyester comprising, as the main constituent unit, ethylene terephthalate;
(B) 0.05 to 15 parts by eight of a crystallization pormotor; and
(C) 0.1 to 15 parts by weight of at least one plasticizer comprising a ($C_2$) ester compound, wherein the ester compound ($C_2$) is dibenzoate of thiodiethanol, dibenzoate of thiodipropanol, dibenzoate of the condensation product of thiodiethanol and diethylene glycol or diacetate of thiodiphenol.

* * * * *